United States Patent [19]

Vinocur

[11] 4,268,130

[45] May 19, 1981

[54] EYE GLASS FRAMES

[76] Inventor: Michael Vinocur, 5 Fisherville Rd., #509, Willowdale, Ontario, Canada

[21] Appl. No.: 914,685

[22] Filed: Jun. 12, 1978

[30] Foreign Application Priority Data

Jun. 21, 1977 [CA] Canada ................................. 281048

[51] Int. Cl.³ ................................................ G02C 5/14
[52] U.S. Cl. ....................................... 351/121; 351/90
[58] Field of Search ................. 351/121, 45, 113, 153, 351/4, 103–106; D16/65, 70; 16/128 A

[56] References Cited

U.S. PATENT DOCUMENTS

| | | | |
|---|---|---|---|
| D. 175,269 | 8/1955 | Nelson | D16/70 |
| D. 191,919 | 8/1965 | Simpson | D16/70 |
| D. 203,483 | 1/1966 | Thomas | D16/70 |
| 1,825,503 | 9/1931 | Carow | 351/103 |
| 2,379,928 | 7/1945 | Rosenheim | 351/121 |
| 2,684,014 | 7/1954 | Fairly | 16/128 A |
| 2,730,924 | 1/1956 | De Angelis | 351/158 |
| 3,425,774 | 2/1969 | Lindbloom | 351/106 |
| 3,654,376 | 4/1972 | Lyons | 351/121 |
| 4,005,930 | 2/1977 | Guenin | 16/128 A |
| 4,021,103 | 5/1977 | Gaspari | 351/106 |

FOREIGN PATENT DOCUMENTS 2301919 8/1973 Fed. Rep. of Germany ... 16/128 A
413913 7/1934 United Kingdom .

OTHER PUBLICATIONS

"The Nile Queen", The Optician, Jul. 30, 1965, p. 107.
Creams, The Optican, vol. 133, Issue #3438, p. XVII, Feb. 22, 1957.

*Primary Examiner*—John K. Corbin
*Assistant Examiner*—B. W. de los Reyes

[57] ABSTRACT

A novel form of eyeglass structure is provided in which the lenses are compressively supported at least at two opposed corners without screws or alternate fastening means. A novel hinge structure is also provided in which two cooperating parts of the hinge are resiliently secured together for facility in assembly and maintenance.

10 Claims, 15 Drawing Figures

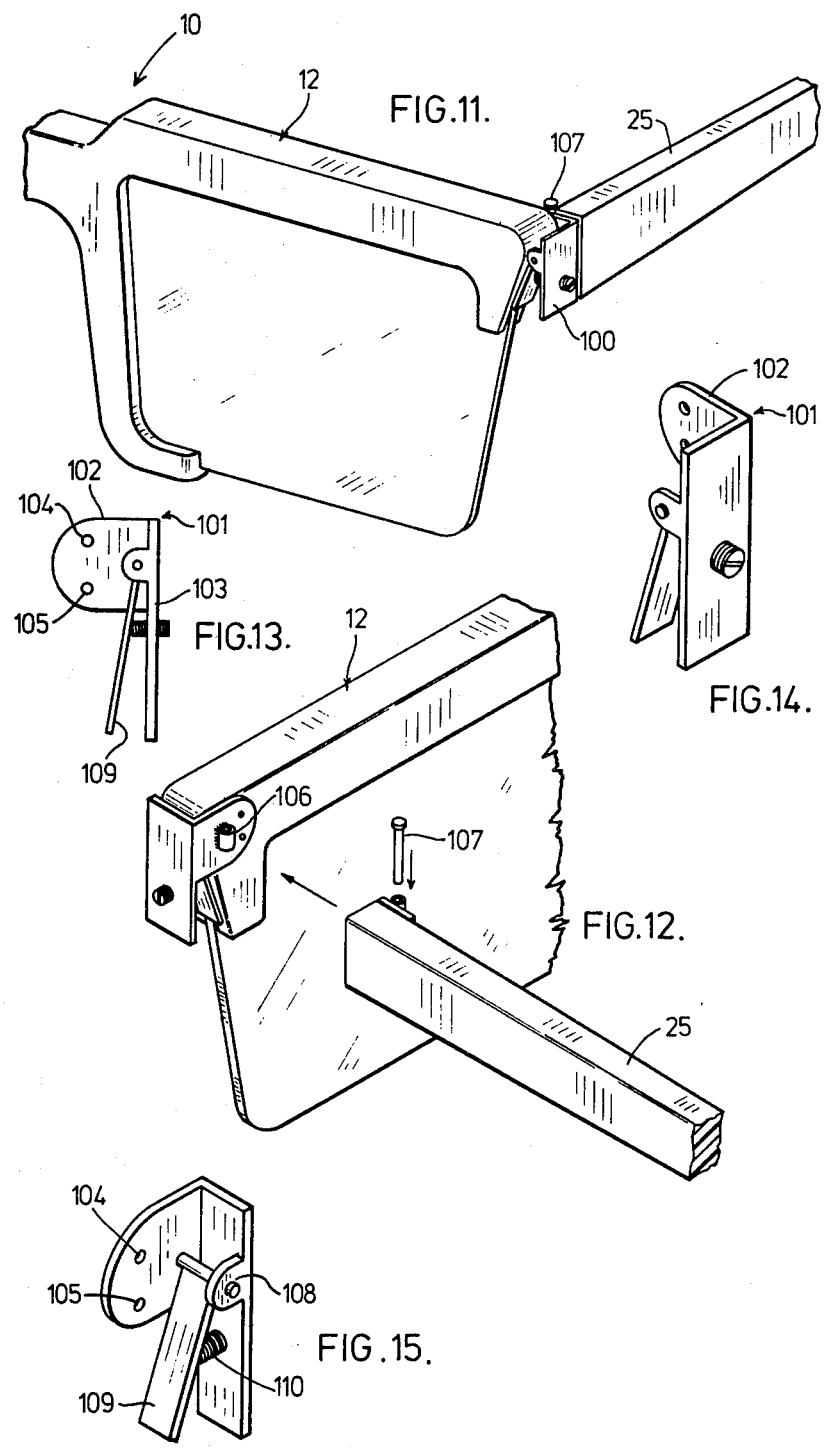

EYE GLASS FRAMES

This invention relates to eyeglass frames or opthalmic mountings with particular reference to a novel construction of frame and hinge therefor.

BACKGROUND OF THE INVENTION

Aesthetics, economy, strength and utility are all important considerations in the design of eyeglass frames.

For vehicle drivers and sportsmen, the wide occlusions in the field of vision which frames present are undesirable and even dangerous.

In this last respect it is desirable that the lateral vision of the wearer be minimally impaired so that the eyeglass wearer and the driver of a vehicle can view passing or overtaking vehicles with minimal difficulty and the sportsman can see a sideways approaching opponent.

The further considerations of economy and strength also require that the eyeglasses be durable while economical to produce. At the same time, the frame should be of such a structure that they may be versatile and provide the basis for a variety of designs.

Various approaches have been proposed such as those set out below in the following U.S. patents, namely:

| U.S. 2,730,924 | De Angelis | January 17, 1956 |
| U.S. 1,825,503 | T. H. Carow | September 29, 1931 |
| Des. 175,269 | Nelson | August 2, 1955 |
| Des. 191,229 | Boxer | August 29, 1961 |
| Des. 201,919 | Simpson | August 10, 1965 |
| Des. 203,483 | Thomas | January 11, 1966 |

The Carow, Simpson, De Angelis and Boxer structures, while they appear to be directed to similar problems, do not have the versatility of design nor economy which the present frame structure provides.

SUMMARY OF THE INVENTION

The present invention provides a novel frame structure in which generally rectangular lenses are employed and have at least two corners cut to provide two parallel oppositely facing edges which are engaged by similarly facing corner members on the frame.

The lenses are maintained in position without screw securement although this may be provided. The absence of screws and the further labour and cost which they involve make the present structure competitive in price.

The form of the frame, as will be seen from the embodiments to be described may take many different forms, each of which has its own individual appearance.

More specifically, in accordance with the present invention, there is provided a lens-supporting structure for use with opthalmic lenses, said lenses having a pair of parallel oppositely-facing edge surfaces, one on either side of a horizontal edge of said lens, said surfaces being inclined to adjacent lens edges, said structure comprising: a nose bridge, a pair of laterally-extending rim sections, one on either side of said bridge, having a lens-receiving channel and a pair of legs hingedly secured to said rim section.

There is also provided in the present disclosure a novel hinge for use with eyeglass frames which may be employed with substantially any type of frame.

This hinge leads to easier maintenance and more facile production. Essentially, it comprises a reversely bent spring of resilient material which is hingedly mounted on either the lens mounting or the leg and then engaged with a channel having an outer narrowed portion and an inner wider section.

This structure permits the leg, hinge or frame to be replaced quickly and economically.

In certain uses where the lenses framed may be subject to greater than usual stresses, it may be necessary to provide additional securement. Again, there is provided in an alternate embodiment a convenient pressure actuated hinge mechanism which may be conveniently employed with conventional frame legs and at the same time serves to provide further support for the lenses.

DESCRIPTION OF THE DRAWINGS

Structures embodying the present invention are illustrated in the following drawings in which:

FIG. 11 is a general perspective view from the front of a part of a further embodiment and illustrates a further means of securing a lens in position in a frame;

FIG. 12 is an exploded perspective view from the rear of the embodiment illustrated in FIG. 11;

FIG. 13 is an end elevation of a lens securing means as employed in the structures of FIGS. 11 and 12; and FIG. 14 and 15 are perspective views of the securing means illustrated in FIGS. 11, 12 and 13 from an outer and an inner side, respectively.

Referring more particularly to the drawings wherein like characters of reference designate like parts throughout the several views the mounting embodying the invention is generally indicated at 10 and comprises a pair of rim sections 11 and 12 having a generally U-shaped cross-section to receive the adjacent edge of a lens.

The rims are connected by a nose bridge 13 which may be of any desirable configuration.

Figure 1:
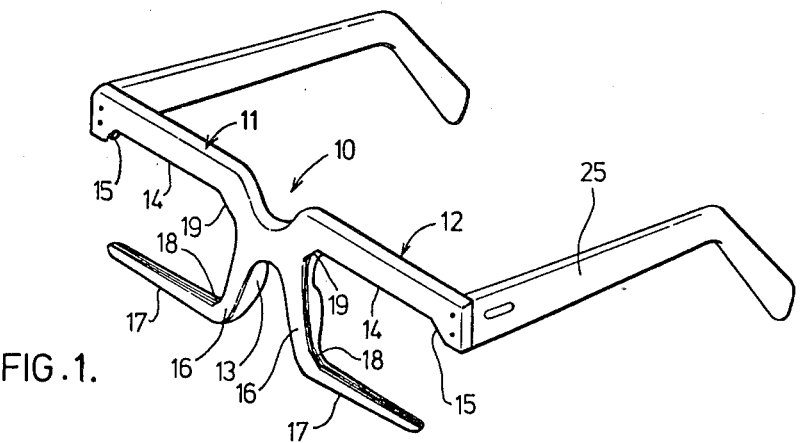
FIG. 1 is a general perspective view of one embodiment of an eyeglass frame in accordance with the present invention.

In FIG. 1, each rim section comprises an upper member 14 and at the outer or lateral side a corner piece 15 is provided.

This corner piece 15 has an inner edge which defines an angle with the inner edge of the horizontal member 14.

At the inner end of member 14, an inner member 16 extends downwardly and a second horizontal member 17 extends outwardly from the bottom of the inner member 16. At the corners, the inner edge junctions of members 12 and 16, and 16 and 17 corner surfaces 19 and 18 respectively are provided. Corner pieces 18 and 15 are parallel and corner piece 19 extends through a plane substantially normal to 18 and 15.

Figure 2:
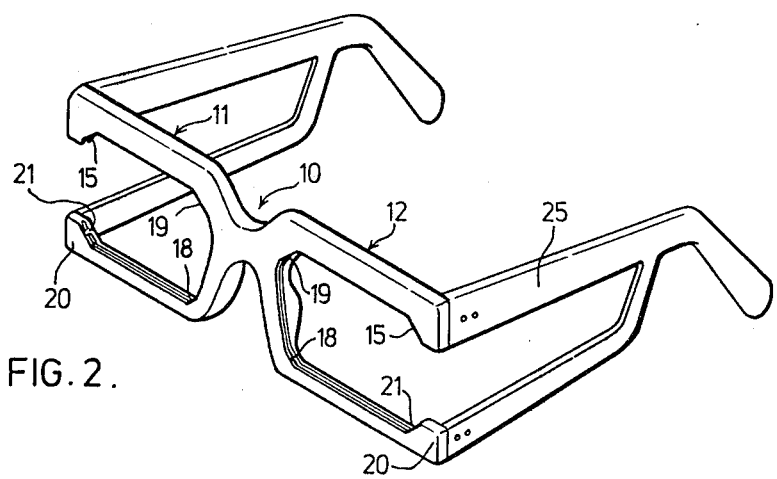
FIG. 2 is a general perspective of an alternative embodiment of an eyeglass frame in accordance with the present invention.

In the embodiment illustrated in FIG. 2, substantially the same structure as is provided in FIG. 1 is shown. However, in this embodiment a further corner piece 20 is provided at the outer end of the lower member 17.

This corner piece 20 has an inner surface or edge 21 which is parallel to its opposed corner 19.

Figure 3:
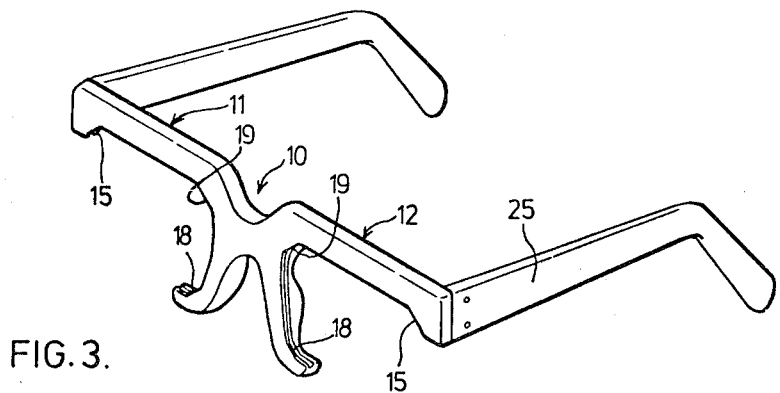
FIG. 3 is a general perspective view of a further alternative embodiment of an eyeglass frame in accordance with the present invention.

As distinct from the embodiments shown in FIGS. 1 and 2, the embodiment shown in FIG. 3 has substantially no lower horizontal member 17 but it is provided with a corner piece providing the surface 18 which has the same parallel relationship to corner surface 15 as existed in the embodiment shown in FIG. 1.

Figure 4:
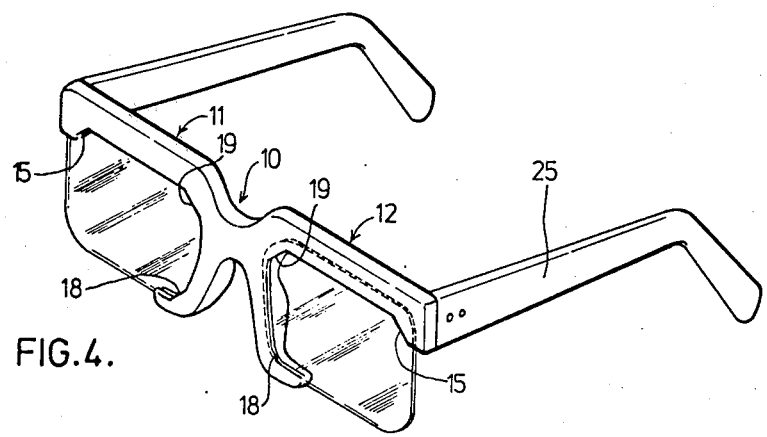
FIG. 4 is a perspective view of the embodiment illustrated in FIG. 3 with the lenses mounted.
Figure 5:
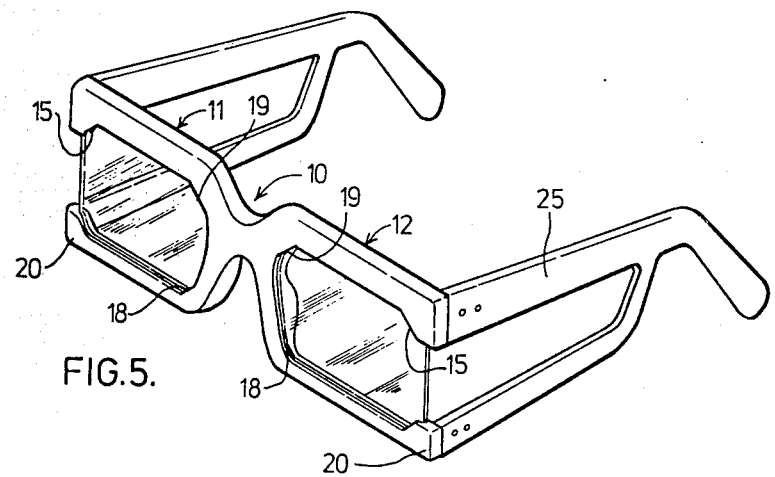
FIG. 5 is a perspective view of the embodiment illustrated in FIG. 2 with the lenses mounted.
Figure 6:
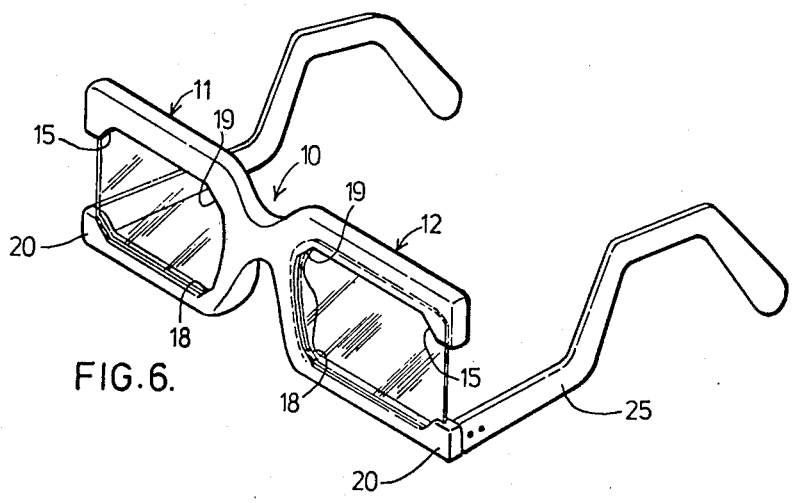
FIG. 6 is a perspective view of a still further embodiment of the invention with the lenses mounted.

In the embodiments shown in FIGS. 4, 5 and 6, lenses are mounted.

As illustrated, the lenses 24 are substantially rectangular in form with the corners cut off at angle. The corner cuts are such that the lenses will cooperate with and conform to the channels in the lens rims 12.

In the embodiment illustrated in FIG. 4, the opposed action of surfaces 15 and 18, and the provision of surface 19 preclude the lenses from movement and they are held securely in position.

In the embodiment illustrated in FIG. 2, surfaces 19 and 21 and 18 and 15 interact with the corresponding adjacent lens edges to compressively hold the lens in position.

In the embodiment illustrated in FIG. 6, the holding action of the lens and frame is the same as that in FIG. 5.

However, it is to be observed that while the embodiments of FIGS. 3 and 4, FIGS. 2 and 5 are similar, those of FIG. 1 and FIG. 6 differ from each other and the remainder both as to the configuration of the lens rim and the securement of the leg so as to give structures of completely different appearance.

In these embodiments each of the lenses is compressively held in position without any fastening, and the wearer's vision is not laterally impaired.

In mounting the lens, it need only be slid into position along the inner grooves where it is seated and held in the manner previously described.

In the embodiment illustrated in FIGS. 1, 3, 4 and 6, single-armed legs, 25, serve to hold the eyeglass frame on the wearer. In FIGS. 2 and 5 the double legs are provided. This structure is stronger and may be aesthetically pleasing to some.

In the embodiment shown in FIG. 6, the leg 25 is bottom-mounted on corner piece 20 to give a further alternate appearance.

Figure 7:
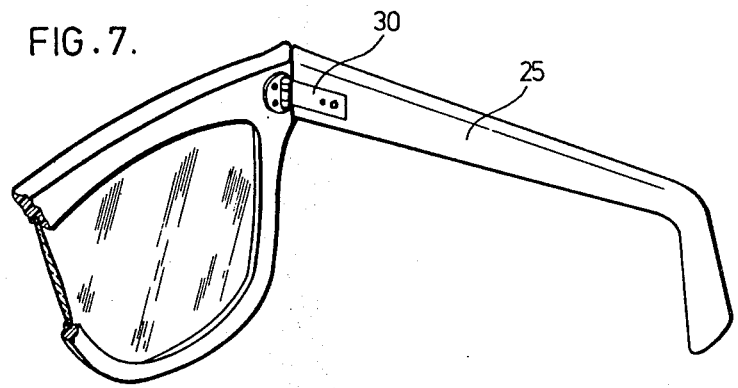
FIG. 7 is a general perspective view of a part of an eyeglass frame embodying a hinge in accordance with the present invention.

Although not visible in FIGS. 1 through 6, the hinge structure intended to be used has the general form shown in FIG. 7 at 30.

Figure 8:
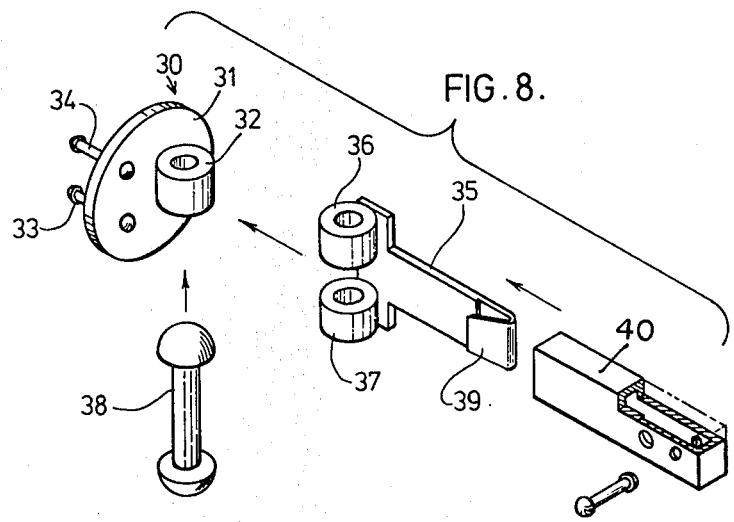
FIG. 8 is an enlarged exploded view of a hinge in accordance with the present invention.

As illustrated in the exploded view in FIG. 8, the hinge 30 comprises a plate 31 which supports a collar 32 and is secured to the lens rim as shown in FIG. 7 by rivets such as 33 and 34.

To collar 32 a hinging member 35 is secured by two spaced apart collars 36 and 37 and a pintle 38. The hinging member 35 comprises an elongate plate which is resilient at least at its free end and reversely bent to provide a hook 39.

Figure 9:
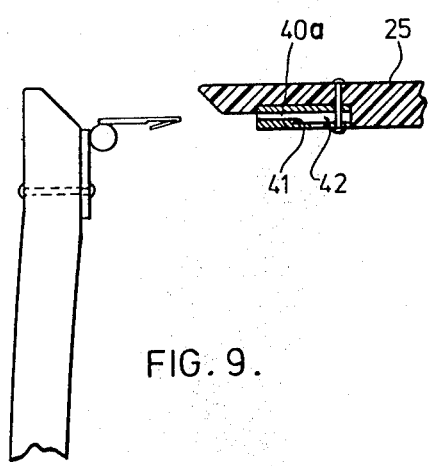
FIGS. 9 and 10 are schematic vertical sections through a leg showing the assembly and cooperation of the leg and hinge components.
Figure 10:
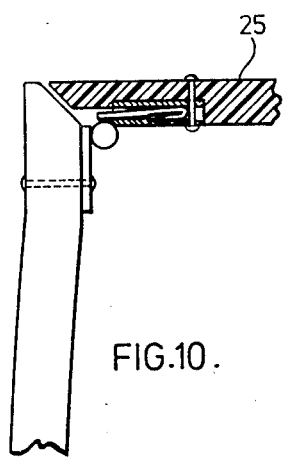

On leg 25 a channel member 40 is provided. This channel member as illustrated in FIGS. 9 and 10 has a narrow entrance channel 40a which is stepped at 41 to provide a wider inner chamber 42. When the plate section of the hinging member 35 is pushed into channel 40, the reversely bent section 39 is compressed as it passes through the original part of the channel 40 and when past step 41, it springs out to be retained in the wider section 42.

As seen in FIGS. 8 through 10, a transverse hole extends through the inner wall of the channel member 40, just behind the step 41, permitting access to the reversibly bent spring section 39. A single rivet extends through holes formed in both walls of the channel member, to secure the channel member to the side piece of the frame.

It will be observed that the screw thread engagement normally used in securing legs to rims has been replaced and that mounting the legs to the rims both in original production and repair has been considerably facilitated.

In the embodiments illustrated in FIGS. 11 through 15, a further alternative means of supporting the lens in the frame is illustrated. As shown in these drawings on the upper outer edge of frame 12, a hinge 100 is mounted. As illustrated hinge 100 comprises an angle 101 including members 102 and 103. Member 102 is secured to the upper rear surface of the frame by rivets 104 and 105 and on the rear surface of member 102, a collar 106 is mounted. This collar mates with spaced collars on the frame leg 25 and is secured therein by pin 107.

Member 103 has a bracket 108 which is provided with a hole therein which hingedly receives plate 109. The attitude of plate 109 is governed by a screw 110 which passes through member 103 and engages the rear or outer surface of plate 109. As the screw 110 is threaded inward it urges plate 109 into contact and pressurable engagement with the outer adjacent edge of the lens and further serves to restrain it from movement.

It will be seen that this new hinge structure is easy to mount, and may be used with the common leg structures. It will also be observed that adjustment will be easily accomplished.

The embodiments of the invention in which an exclusive property or privilege is claimed are defined as follows:

1. A lens supporting structure for use with viewing lenses of a generally rectangular shape having a pair of parallel diametrically opposed corner edge surfaces, inclined with respect to adjacent lens edges, said structure comprising: a nose bridge, a pair of rim sections connected to said bridge on either side thereof, a pair of legs, and hinge means for connecting said legs to said rim section; each of said rim sections comprising: a first frame part extending from the upper end of said nose bridge substantially horizontal having a lens-receiving channel, and a corner part at its end remote from the nose bridge inclined downwardly with respect to the horizontal, said nose bridge having a lens receiving channel and a corner part at its lower end inclined parallel to and diametrically opposed to the corner part on said first frame part on said first frame part, each of said rims being open at least a portion of their remaining periphery, to permit said corner parts to compressively grasp and maintain the lens in said lens-receiving channel.

2. A lens-supporting structure as claimed in claim 1 further including a second substantially horizontal part spaced apart from and connected to said first-mentioned horizontal part.

3. A lens-supporting structure as claimed in claim 2 including at least four corner parts, one corner part adjacent each inner end and each outer end of said horizontal parts.

4. A lens-supporting structure as claimed in claim 3 wherein said horizontal parts include upper and lower ones, and wherein said legs are hingedly secured to one of said upper and lower horizontal parts.

5. A lens-supporting structure as claimed in claim 3 wherein said horizontal parts include upper and lower ones and said legs are hingedly secured to each of said upper and lower horizontal parts.

6. The lens supporting structure according to claim 1 wherein said corner parts are inclined at a straight line.

7. A lens supporting structure for use with opthalmic lenses and comprising a rim and a pair of supporting legs connected to said rim, each said leg being connected by a hinge, said hinge comprising a plate for securement to one of an eyeglass supporting rim or leg and a reversely bent spring member of resilient material having one leg thereof shorter than another hingedly secured thereto; and a closed channel member secured to the other one of said leg or rim; said channel having an open end dimensioned to receive said spring member longitudinally therein, an internal step to permit compression of said spring member on insertion within said channel and to effect releasable locking thereof on passage over said step, and a transverse hole through said closed channel member in registry with the shorter leg of said spring when locked in said channel.

8. A lens-supporting structure for use with opthalmic lenses and comprising a rim for supporting said lenses and a pair of supporting legs hingedly secured to said rim, one at either lateral side, each said leg being connected to said rim by a hinge, said hinge comprising a first member secured to one of said rims or said leg and a second member connected to said other of said leg or said rim; said first and second members being releasably and resiliently engageable one with the other, said hinge means includes a movable arm and a threaded screw for urging said arm into pressurable engagement with an adjacent lens edge.

9. A lens-supporting structure as claimed in claim 8 wherein said hinge means comprises an angle including a first member hingedly connectable to a leg and a second member substantially normal thereto, a plate movably secured to said first and second member and means for moving said plate into engagement with an adjacent edge of a lens.

10. A lens-supporting structure as claimed in claim 9 wherein said plate is hingedly secured to said first and second members.

* * * * *